(12) United States Patent
Lu

(10) Patent No.: US 6,820,977 B1
(45) Date of Patent: Nov. 23, 2004

(54) EYEGLASSES WITH TWO PAIRS OF LENSES

(75) Inventor: Wei-Xiong Lu, Guangzhou (CN)

(73) Assignee: Bae Her Industrial Corp., Tainan (TW)

( * ) Notice: Subject to any disclaimer, the term of this patent is extended or adjusted under 35 U.S.C. 154(b) by 0 days.

(21) Appl. No.: 10/635,984

(22) Filed: Aug. 7, 2003

(51) Int. Cl.[7] .............................................. G02C 7/08
(52) U.S. Cl. ...................................... 351/57; 351/47
(58) Field of Search .......................... 351/47, 57, 58, 351/110

(56) References Cited

U.S. PATENT DOCUMENTS 5,896,186 A * 4/1999 Roban ...................... 351/110
5,936,700 A * 8/1999 Masunaga .................... 351/47

* cited by examiner

*Primary Examiner*—Huy Mai
(74) *Attorney, Agent, or Firm*—Alan D. Kamrath; Nikolai & Mersereau, P.A.

(57) ABSTRACT

A pair of eyeglasses comprises a pair of myopic, hypermetropic, or presbyopic lenses, a pair of endpieces having rear ends coupled to temples, each endpiece including a horizontal first hole at a forward end for permitting a fastener to drive into to secure the first endpiece to the lens, and two elongate first slots above and under the first hole respectively, a bridge interconnected the lenses, the bridge including two horizontal second holes at both ends for permitting two fasteners to drive into to secure the bridge to the lens, and two elongate second slots above and under the second hole respectively, and a pair of tinted lenses each including an inner recess snugly fitted onto the second slots and an outer recess snugly fitted onto the first slots.

5 Claims, 2 Drawing Sheets

EYEGLASSES WITH TWO PAIRS OF LENSES

BACKGROUND OF THE INVENTION

1. Field of the Invention

The present invention relates to eyeglasses and more particularly to a pair of eyeglasses having one pair of myopic, hypermetropic, or presbyopic lenses and the other pair of tinted lenses attached thereon with improved characteristics.

2. Description of Related Art

A pair of conventional eyeglasses having one pair of myopic, hypermetropic, or presbyopic lenses cannot protect the eyes from sun's glare. For the purpose of protecting eyes, many eyeglass manufacturers devise an arrangement of attaching another pair of tinted lenses on the myopic, hypermetropic, or presbyopic lenses by hanging them on the eyeglass frame so that the tinted lenses may be pivoted upward or downward as wearer desires. However, such arrangement may bring inconvenience and/or cause discomfort to wearer. Another technique of attaching tinted lenses to the pair of myopic, hypermetropic, or presbyopic lenses is by mounting magnetic materials in screw locations of both the tinted lenses and the pair of myopic, hypermetropic, or presbyopic lenses so that both pairs of lenses may attach together by magnetic force. However, such attachment is not reliable. The outer tinted lenses may fall on the ground when the wearer engages in vigorous exercise. Also, there is a gap between these two pairs of lenses, resulting in detraction from its external appearance and an increase of the manufacturing cost. Thus, continuing improvements in the exploitation of the eyeglasses having one pair of myopic, hypermetropic, or presbyopic lenses and the other pair of tinted lenses attached thereon are constantly being sought.

SUMMARY OF THE INVENTION

It is an object of the present invention to provide a pair of eyeglasses, comprising a pair of temples; a pair of first lenses; a pair of endpieces having rear ends coupled to the temples, each of the endpieces including a horizontal first hole at a forward end for permitting a fastener to drive into to fasten the first endpiece and the first lens together, and two elongate first slots above and under the first hole respectively; a pair of nosepads; a bridge interconnected the first lenses, the bridge including two horizontal second holes at both ends for permitting two fasteners to drive into to fasten the bridge and the first lens together, and two elongate second slots above and under the second hole respectively; and a pair of second lenses each including an inner recess snugly fitted onto the second slots and an outer recess snugly fitted onto the first slots so that the first and the second lenses are closely attached together.

In one aspect of the present invention the first lenses are myopic, hypermetropic, or presbyopic lenses.

In another aspect of the present invention the second lenses-are tinted lenses and are made of plastic material.

In still another aspect of the present invention each of a plurality of aesthetic, plastic caps is placed on the first or second hole to cover the fastener.

The above and other objects, features and advantages of the present invention will become apparent from the following detailed description taken with the accompanying drawings.

DETAILED DESCRIPTION OF THE PREFERRED EMBODIMENTS

Figure 1:
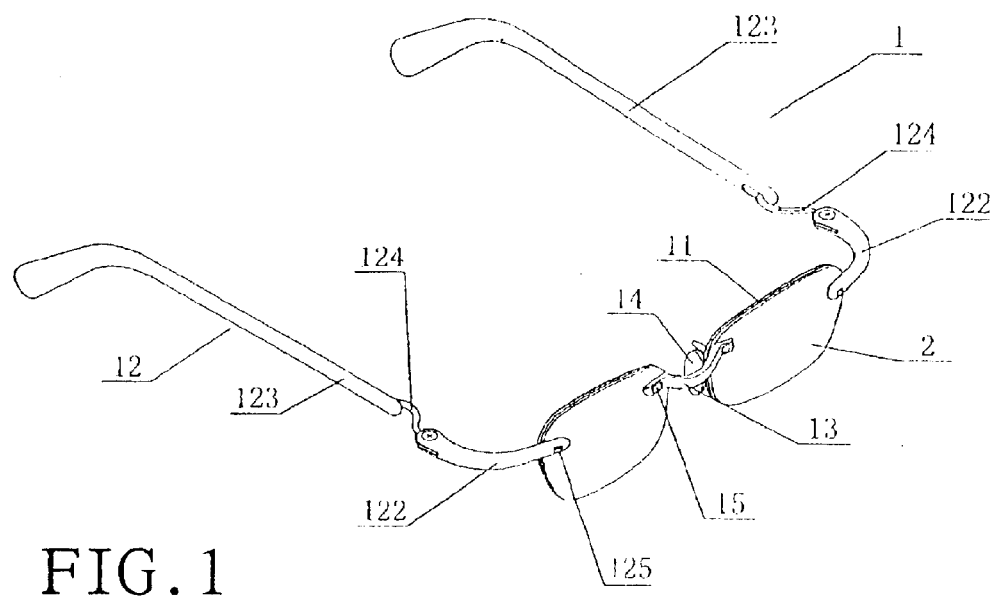
FIG. 1 is a perspective view of a preferred embodiment of eyeglasses with two pairs of lenses according to the invention.
Figure 3:
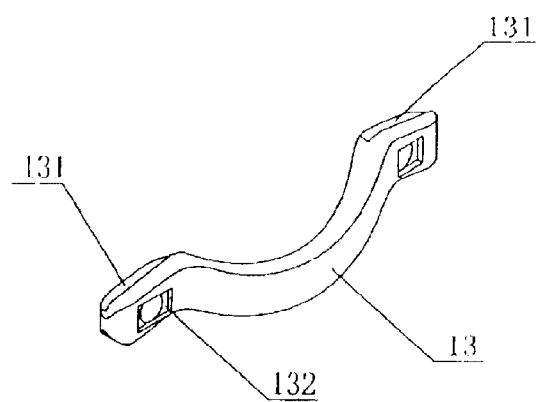
FIG. 3 is a perspective view of the bridge.
Figure 2:
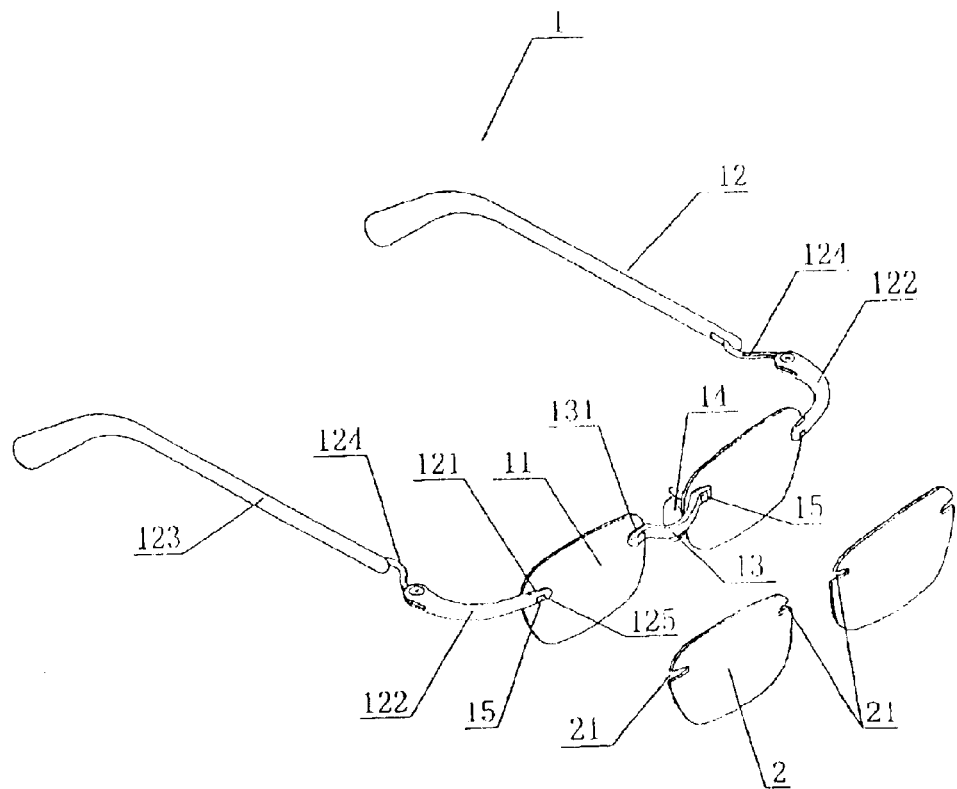
FIG. 2 is a view similar to FIG. 1 where the outer pair of tinted lenses are separated.

Referring to FIGS. 1, 2 and 3, a pair of eyeglasses 1 constructed in accordance with the invention is shown. The eyeglasses 1 comprises a pair of temples 123, a pair of myopic, hypermetropic, or presbyopic lenses 11, a pair of first endpieces 122 each including a horizontal hole 125 at a forward end for permitting a screw 15 to drive into to fasten the first endpiece 122 and the lens 11 together, and two elongate slots 121 above and under the hole 125 respectively, a pair of second endpieces 124 interconnected the rear ends of the first endpieces 122 and the forward ends of the temples 123, a pair of nosepads 14, a bridge 13 interconnected the lenses 11, and a pair of tinted lenses 2 attached onto the lenses 11 by means of the bridge 13 as detailed below.

The bridge 13 comprises two horizontal holes 132 at both ends for permitting two screws 15 to drive into to fasten the bridge 13 and the lens 11 together, and two elongate slots 131 above and under the hole 132 respectively. Each tinted lens 2 comprises an inner recess 21 snugly fitted onto the slots 131 and an outer recess 21 also snugly fitted onto the slots 121. Both the lenses 2 and 11 are closely attached together. Also, the fastening of the tinted lenses 2 and the bridge 13 is reliable. Hence, there is no need of worrying about the tinted lenses falling on the ground even when the wearer engages in vigorous exercise. For enabling the tinted lenses 2 to easily mount on the lens 11 by snapping or detach therefrom by unsnapping, preferably, the tinted lenses 11 are made of plastic material having an acceptable flexibility. Moreover, plastic caps may be placed on the holes 125 to cover the screws 15 for aesthetic purpose.

While the invention herein disclosed has been described by means of specific embodiments, numerous modifications and variations could be made thereto by those skilled in the art without departing from the scope and spirit of the invention set forth in the claims.

What is claimed is:

1. A pair of eyeglasses, comprising:

a pair of temples;

a pair of first lenses;

a pair of endpieces having rear ends coupled to the temples, each of the endpieces including a horizontal first hole at a forward end for permitting a fastener to drive into to fasten the first endpiece and the first lens together, and two elongate first slots above and under the first hole respectively;

a pair of nosepads;

a bridge interconnected the first lenses, the bridge including two horizontal second holes at both ends for permitting two fasteners to drive into to fasten the bridge and the first lens together, and two elongate second slots above and under the second hole respectively; and a pair of second lenses each including an inner recess snugly fitted onto the second slots and an outer recess snugly fitted onto the first slots so that the first and the second lenses are closely attached together.

2. The eyeglasses of claim 1, wherein the first lenses are myopic, hypermetropic, or presbyopic lenses.

3. The eyeglasses of claim 1, wherein the second lenses are tinted lenses.

4. The eyeglasses of claim 3, wherein the tinted lenses are made of plastic material.

5. The eyeglasses of claim 1, further comprising a plurality of plastic caps each placed on the first or second hole to cover the fastener.

* * * * *